(12) United States Patent
Zhou et al.

(10) Patent No.: US 9,563,003 B2
(45) Date of Patent: Feb. 7, 2017

(54) LIQUID CRYSTAL DISPLAY DEVICE

(71) Applicants: HEFEI BOE OPTOELECTRONICS TECHNOLOGY CO., LTD., Anhui (CN); BOE TECHNOLOGY GROUP CO., LTD., Beijing (CN)

(72) Inventors: Bozhu Zhou, Beijing (CN); Jae Yun Jung, Beijing (CN); Dae Oh Oh, Beijing (CN); Shikai Wang, Beijing (CN); Jianming Jiang, Beijing (CN); Jianwei Wang, Beijing (CN)

(73) Assignees: HEFEI BOE OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 225 days.

(21) Appl. No.: 14/141,572

(22) Filed: Dec. 27, 2013

(65) Prior Publication Data

US 2014/0204311 A1    Jul. 24, 2014

(30) Foreign Application Priority Data

Jan. 23, 2013 (CN) .......................... 2013 1 0025746

(51) Int. Cl.
*G02F 1/1335* (2006.01)
*F21V 8/00* (2006.01)

(52) U.S. Cl.
CPC ........... *G02B 6/0038* (2013.01); *G02B 6/0036* (2013.01)

(58) Field of Classification Search
CPC .............. G02F 1/133615; G02F 1/1336; G02F 2001/133607; G02B 6/0038; G02B 6/0036
(Continued)

(56) References Cited

U.S. PATENT DOCUMENTS

| 2007/0035680 A1* | 2/2007 | Watanuki | G02B 6/0061 349/61 |
| 2010/0182534 A1* | 7/2010 | Usukura | G02B 3/0056 349/62 |
| 2012/0113158 A1* | 5/2012 | Goto | G02B 6/0038 345/690 |

FOREIGN PATENT DOCUMENTS

CN    202083812 U    12/2011
JP    08-248421    9/1996

OTHER PUBLICATIONS

Chinese Office Action dated Jan. 13, 2015 regarding Application No. 201310025746.3, filed Jan. 23, 2013. Translation provided by Dragon Intellectual Property Law Firm.

(Continued)

*Primary Examiner* — Nathanael R Briggs
*Assistant Examiner* — William Peterson
(74) *Attorney, Agent, or Firm* — Harness, Dickey & Pierce, P.L.C.

(57) ABSTRACT

The present invention provides a liquid crystal display device, comprising: a light source, a light guide plate having a light-exiting surface, a substrate having a first surface and a second surface opposite to the first surface, a display area of the second surface comprising a pixel area and at least one non-pixel area, and a gap provided between the light-exiting surface of the light guide plate and the first surface of the substrate, wherein, at least one slot is provided on the light-exiting surface of the light guide plate; a part of the light generated by the light source and entering the light-exiting surface of the light guide plate, after being refracted by the slot and the gap sequentially, is refracted by the first surface of the substrate into the substrate, and then enters the pixel area. According to the present invention, it is able to change the light transmission path, thereby to effectively reduce the light entering a non-pixel area.

19 Claims, 2 Drawing Sheets

(58) Field of Classification Search
USPC .......................................................... 349/62
See application file for complete search history.

(56) References Cited

OTHER PUBLICATIONS

Second Chinese Office Action dated Jul. 23, 2015 regarding Application No. 201310025746.3. Translation provided by Dragon Intellectual Property Law Firm.

* cited by examiner

LIQUID CRYSTAL DISPLAY DEVICE

CROSS REFERENCE

The present application claims and benefits a priority of the Chinese patent application No. 201310025746.3, filed on Jan. 23, 2013 and entitled "liquid crystal display device", which is incorporated herein by reference in its entirety.

BACKGROUND OF THE INVENTION

Field Of The Invention

The present invention relates to the field of liquid crystal technology, in particular to a liquid crystal display device.

Description Of The Prior Art

Currently, the uniformity of light emission is mainly considered for the design of a backlight module. For example, a triangle-like (i.e., a shape similar to a triangle, including triangles, deformations and relevant shapes thereof) prism is used to make light emitting from a specific position of a backlight plate, and the light may be emitted mainly from an opening area of a liquid crystal panel through total reflection of the prism. The small-angle light emitted through the total reflection at a small angle, is mainly used for the backlight plate which the light source is side-placed. As shown in FIG. 1, the small-angle light is emitted from the light source, allowed to enter into an upper prism 12 through a lower prism 11, reflected by the total reflection surface of the upper prism 12, and then emerged from an opening of an upper liquid crystal panel 13.

Although the backlight plate in FIG. 1 is capable of emitting the light from a specific area at a small angle (mainly when the light source is side-placed), actually a part of the light will enter a non-pixel area (non-opening area) because a technology that a light beam is modulated to an opening area of the liquid crystal panel by total reflection is used. As a result, this part of the light will be absorbed by a black matrix and various films, which is unable to make effective use of the light.

SUMMARY OF THE INVENTION

An object of the present invention is to provide a liquid crystal display device to solve the above technical problems, so as to change the light transmission path, thereby to effectively reduce the light entering a non-pixel area.

An aspect of the present invention provides: a liquid crystal display device comprises: a light source, a light guide plate having a light-exiting surface, a substrate having a first surface and a second surface opposite to the first surface, a display area of the second surface comprising a pixel area and at least one non-pixel area, and a gap provided between the light-exiting surface of the light guide plate and the first surface of the substrate, wherein, at least one slot is provided on the light-exiting surface of the light guide plate; a part of the light generated by the light source and entering the light-exiting surface of the light guide plate, after being refracted by the slot and the gap in succession, is refracted by the first surface of the substrate into the substrate, and then enters the pixel area.

An aspect of the present invention has following advantageous effects. The slot is provided on the light-exiting surface of the light guide plate, so that a part of the light generated by the light source and entering the light-exiting surface of the light guide plate, upon refracted by the slot, can travel outside the light-exiting surface of the light guide plate in a predetermined travelling direction and then can be refracted into the pixel area. As a result, it is able, on one hand, to prevent a light loss and an adverse affect on the electrical properties of a semiconductor area due to the absorption of the light in the non-pixel area, and on the other hand, to help to decrease the wire width of the black matrix, thereby to improve an aperture ratio and light transmission of the liquid crystal panel.

In a preferred embodiment according to the aspect of the present invention, the slot has a cross section of a triangle-like shape, which may be helpful in controlling the light transmitting on a predetermined travelling direction.

In a preferred embodiment according to the above embodiments, the slot has a cross section of an isosceles triangle.

In a preferred embodiment according to the above embodiments, the at least one slot corresponds to the at least one non-pixel area. A bottom side of each slot has a width approximately equal to the width of the non-pixel area, and the center line of the bottom side of the slot approximately coincides with the center line of the non-pixel area.

In a preferred embodiment according to the above embodiments, a medium within the slot has a refractive index less than the refractive index of the light-exiting surface of the light guide plate, and the part of the light generated by the light source and entering the light-exiting surface of the light guide plate is refracted in the slot, and continuously refracted by the gap and the substrate, so that at least a part of the light that should have been emitted toward the non-pixel area can be refracted to the pixel area in a divergent manner.

In a preferred embodiment according to the above embodiments, when the medium within the slot has a refractive index less than the refractive index of the light-exiting surface of the light guide plate, the following formula should be satisfied:

$$L \approx L_0$$
$$\theta_1 = \alpha$$
$$N_2 \sin(\theta_1 + \theta_2) = N_1 \sin\theta_1$$
$$N_2 \sin\theta_2 = N_3 \sin\theta_3 = N_4 \sin\theta_4$$
$$\frac{1}{2} L \tan\alpha \tan\theta_2 + D_3 \tan\theta_3 + D_4 \tan\theta_4 \geq \frac{1}{2} L_0,$$

wherein L represents a width of the bottom side of the slot, $L_0$ represents a width of the non-pixel area, $\alpha$ represents a base angle of the cross section of the slot, $N_1$ represents a refractive index of the light-exiting surface of the light guide plate, $N_2$ represents a refractive index of the medium within the slot, $N_3$ represents a refractive index of a medium within the gap, $N_4$ represents a refractive index of the substrate, $\theta_1$ represents an incident angle of the light at the light-exiting surface of the light guide plate, $\theta_2$ represents an incident angle of the light from the medium within the slot to the medium within the gap, $\theta_3$ represents an incident angle of the light from the medium within the gap to the substrate, $\theta_4$ represents a refraction angle of the light from the medium within the gap to the substrate, $D_3$ represents a thickness of the gap, and $D_4$ represents a thickness of the substrate.

In a preferred embodiment according to the above embodiments, when the medium within the slot has a refractive index less than the refractive index of the light-exiting surface of the light guide plate, the following formula should be satisfied:

$$L \approx L_0$$

$$\theta_1 = \alpha$$

$$N_2 \sin(\theta_1 + \theta_2) = N_1 \sin\theta_1$$

$$N_2 \sin\theta_2 = N_3 \sin\theta_3 = N_4 \sin\theta_4$$

$$0 < \frac{1}{2} L \tan\alpha \tan\theta_2 + D_3 \tan\theta_3 + D_4 \tan\theta_4 < \frac{1}{2} L_0,$$

wherein L represents a width of the bottom side of the slot, $L_0$ represents a width of the non-pixel area, $\alpha$ represents a base angle of the cross section of the slot, $N_1$ represents a refractive index of the light-exiting surface of the light guide plate, $N_2$ represents a refractive index of the medium within the slot, $N_3$ represents a refractive index of a medium within the gap, $N_4$ represents a refractive index of the substrate, $\theta_1$ represents an incident angle of the light at the light-exiting surface of the light guide plate, $\theta_2$ represents an incident angle of the light from the medium within the slot to the medium within the gap, $\theta_3$ represents an incident angle of the light from the medium within the gap to the substrate, $\theta_4$ represents a refraction angle of the light from the medium within the gap to the substrate, $D_3$ represents a thickness of the gap, and $D_4$ represents a thickness of the substrate.

In a preferred embodiment according to the above embodiments, the medium within the slot has a refractive index greater than the refractive index of the light-exiting surface of the light guide plate, and the part of the light generated by the light source and entering the light-exiting surface of the light guide plate is refracted within the slot, and continuously refracted by the gap and the substrate, so that the light that should have been emitted toward the non-pixel area is refracted to the pixel area in a convergent manner.

In a preferred embodiment according to the above embodiments, when the medium within the slot has a refractive index greater than the refractive index of the light-exiting surface of the light guide plate, the following formula should be satisfied:

$$L \approx L_0$$

$$\theta_1 = \alpha$$

$$N_2 \sin(\theta_1 - \theta_2) = N_1 \sin\theta_1$$

$$N_2 \sin\theta_2 = N_3 \sin\theta_3 = N_4 \sin\theta_4$$

$$D_3 \tan\theta_3 + D_4 \tan\theta_4 \geq L_0,$$

wherein L represents a width of the bottom side of the slot, $L_0$ represents a width of the non-pixel area, $\alpha$ represents a base angle of the cross section of the slot, $N_1$ represents a refractive index of the light-exiting surface of the light guide plate, $N_2$ represents a refractive index of the medium within the slot, $N_3$ represents a refractive index of a medium within the gap, $N_4$ represents a refractive index of the substrate, $\theta_1$ represents an incident angle of the light at the light-exiting surface of the light guide plate, $\theta_2$ represents an incident angle of the light from the medium within the slot to the medium within the gap, $\theta_3$ represents an incident angle of the light from the medium within the gap to the substrate, $\theta_4$ represents a refraction angle of the light from the medium within the gap to the substrate, $D_3$ represents a thickness of the gap, and $D_4$ represents a thickness of the substrate.

In a preferred embodiment according to the above embodiments, when the medium within the slot has a refractive index greater than the refractive index of the light-exiting surface of the light guide plate, the following formula should be satisfied:

$$L \approx L_0$$

$$\theta_1 = \alpha$$

$$N_2 \sin(\theta_1 - \theta_2) = N_1 \sin\theta_1$$

$$N_2 \sin\theta_2 = N_3 \sin\theta_3 = N_4 \sin\theta_4$$

$$0 < D_3 \tan\theta_3 + D_4 \tan\theta_4 < L_0,$$

wherein L represents a width of the bottom side of the slot, $L_0$ represents a width of the non-pixel area, $\alpha$ represents a base angle of the cross section of the slot, $N_1$ represents a refractive index of the light-exiting surface of the light guide plate, $N_2$ represents a refractive index of the medium within the slot, $N_3$ represents a refractive index of a medium within the gap, $N_4$ represents a refractive index of the substrate, $\theta_1$ represents an incident angle of the light at the light-exiting surface of the light guide plate, $\theta_2$ represents an incident angle of the light from the medium within the slot to the medium within the gap, $\theta_3$ represents an incident angle of the light from the medium within the gap to the substrate, $\theta_4$ represents a refraction angle of the light from the medium within the gap to the substrate, $D_3$ represents a thickness of the gap, and $D_4$ represents a thickness of the substrate.

In a preferred embodiment according to the above embodiments, the light source generates the light perpendicular to the light-exiting surface of the light guide plate.

In a preferred embodiment according to the above embodiments, the light source is a direct-type backlight source.

In a preferred embodiment according to the above embodiments, the substrate is display panel, the pixel area is light-emitting area, and the non-pixel area is light-shaping area.

DETAILED DESCRIPTION OF THE PREFERRED EMBODIMENTS

Figure 1:
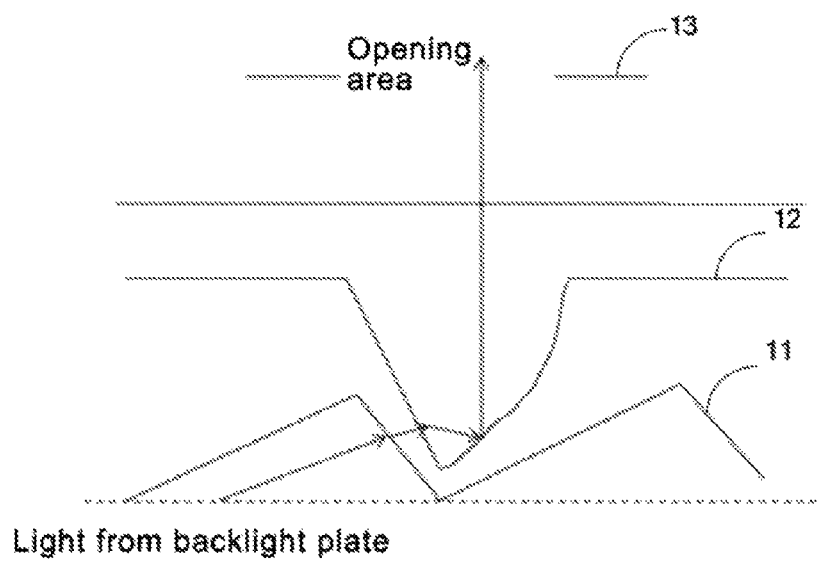
FIG. 1 is a schematic view showing the light emitted at a small angle range by a backlight module of a liquid crystal display device, through which a light is emitted from a specific position at a small angle in the prior art.

Some exemplary embodiments according to the present invention are described in detail hereinafter with reference to the drawings. It should be understood that, although some exemplary embodiments are shown in the drawings, the present invention may be implemented in various forms but not limited to the illustrative embodiments. Instead, these embodiments are provided so as to enable a person skilled in the art to understand the present invention in a better manner and to be aware of the entire disclosure thereof.

Figure 2:
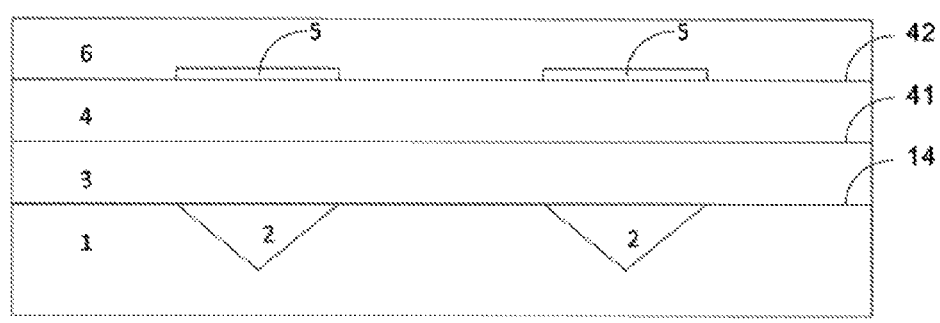
FIG. 2 is a schematic view showing a liquid crystal display device according to one embodiment of the present invention.
Figure 3:
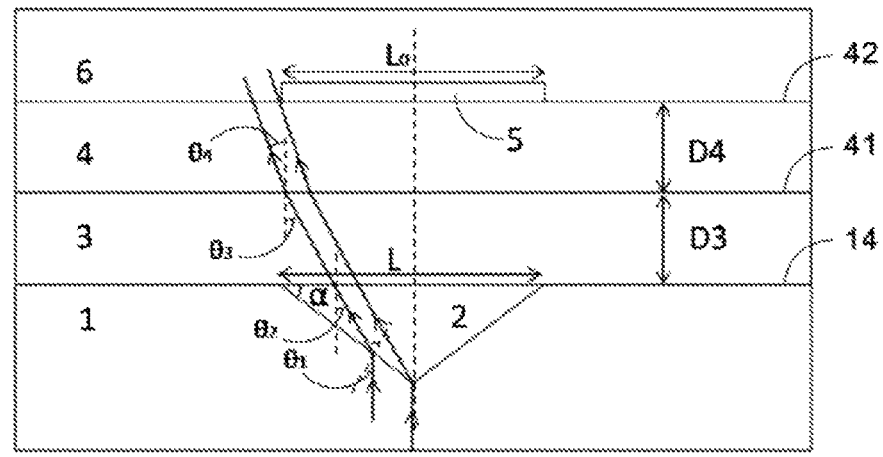
FIG. 3 is a schematic view showing the light travel when a medium within a slot is an optically thinner medium relative to the medium of a light-exiting surface of the light guide plate according to one embodiment of the present invention.
Figure 4:
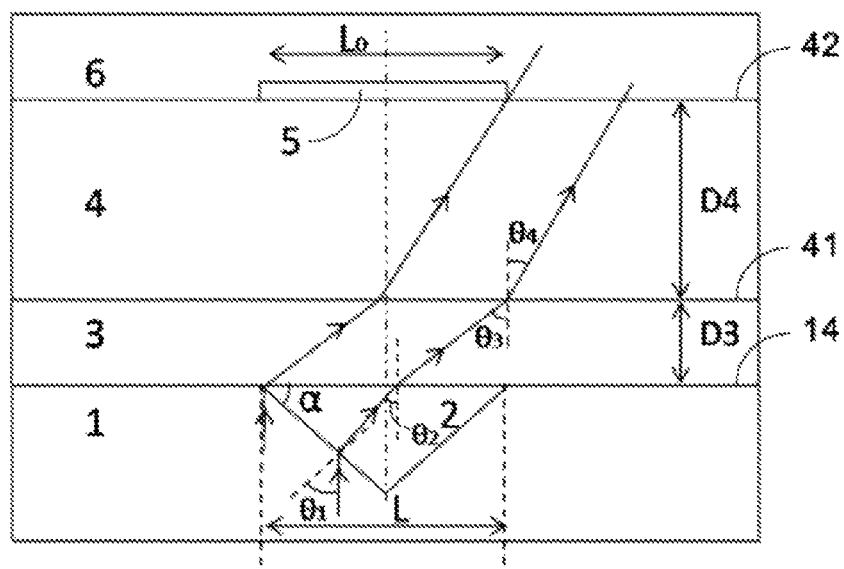
FIG. 4 is a schematic view showing the light travel when a medium within a slot is optically denser medium relative to the medium of a light-exiting surface of the light guide plate according to one embodiment of the present invention.

Referring to FIGS. 2-4, one of embodiments according to the present invention provides a liquid crystal display device, which comprises: a light source (not shown); a light guide plate, which has a light-exiting surface 14 on which at least one slot 2 is provided; a substrate 4, which has a first surface 41 and a second surface 42 opposite to the first surface 41, and a gap 3 between the light-exiting surface 14 of the light guide plate 1. A display area on the second surface 42 of the substrate 4 comprises a pixel area 6 and at least one non-pixel area 5. A part of the light generated by the light source and entering the light-exiting surface 14 of the light guide plate, after being refracted by the slot 2 and the gap 3 sequentially, is refracted from the first surface of the substrate 4 into the substrate 4, and then enters the pixel area 6.

The pixel area 6 of the substrate 4 is an effective pixel area of the substrate 4. And the non-pixel area 5 is an ineffective pixel area, on which black matrixes, data lines and/or grid lines are provided. The non-pixel area 5 is preferably provided with black matrixes. Preferably, the substrate is display panel, the pixel area is light-emitting area, and the non-pixel area is light-shaping area.

Alternatively, the light source is that generates the light perpendicular to the light-exiting surface 14 of the light guide plate 1.

Preferably, the light source is a direct-type backlight source. The light generated by the direct-type backlight source is perpendicular to the light-exiting surface 14 of the light guide plate, so it is unnecessary to provide a deflector for deflecting the light generated by the light source and not perpendicular to the light guide plate into the light perpendicular to the light-exiting surface 14 of the light guide plate.

In one embodiment, the slot 2 has a cross section of a triangle-like shape (i.e., a shape similar to a triangle, including triangles, deformations and relevant shapes thereof), preferably, an isosceles triangle.

In one embodiment according to the present invention, a bottom side of the slot 2 has a width equal to a width $L_0$ of the non-pixel area 5, and the center line of the bottom side of the slot 2 is aligned with the center line of the non-pixel area 5.

The structure of the liquid crystal display device is described hereinafter in conjunction with two embodiments, where a light source of a direct-type backlight source is taken as an example, but the present invention is not limited to such light source. In the first embodiment, the medium within the slot 2 is optically thinner medium relative to the medium of light-exiting surface 14 of the light guide plate. While in the second embodiment, the medium within the slot 2 is optically denser medium relative to the medium of the light-exiting surface 14 of the light guide plate. In these embodiments, the medium with a small refractive index (i.e., a higher light travel speed can be gotten in it) may be called as a optically thinner medium, while the medium with a great refractive index (i.e., a lower light travel speed can be gotten in it) may be called as a optically denser medium. As compared with the optically denser medium, the light will travel in the optically thinner medium at a higher speed and with a smaller absolute refractive index. When the light travels in these two media, an angle between the light and a normal for the optically thinner medium is greater than that for the optically denser medium. Of course, it should be appreciated that, the optically thinner medium and the optically denser medium are relative to each other. For example, if the refractive index of air is 1, the refractive index of water is 1.33 and the refractive index of glass is 1.5, water is an optically denser medium relative to air and an optically thinner medium relative to glass.

First Embodiment

To be specific, as shown in FIG. 3, when the medium within the slot 2 is optically thinner medium relative to the medium of the light-exiting surface 14 of the light guide plate 1, i.e., the refractive index $N_2$ of the medium within the slot 2 is less than the refractive index $N_1$ of the light-exiting surface 14 of the light guide plate 1, the following formula (1) shall be satisfied:

$$\begin{cases} L \approx L_0 \\ \theta_1 = \alpha \\ N_2 \sin(\theta_1 + \theta_2) = N_1 \sin\theta_1 \\ N_2 \sin\theta_2 = N_3 \sin\theta_3 = N_4 \sin\theta_4 \\ \frac{1}{2} L \tan\alpha \tan\theta_2 + D_3 \tan\theta_3 + D_4 \tan\theta_4 \geq \frac{1}{2} L_0. \end{cases} \quad (1)$$

If it is not required that all (or almost all) of the light shall enter the pixel area, the following formula (2) shall be satisfied:

$$\begin{cases} L \approx L_0 \\ \theta_1 = \alpha \\ N_2 \sin(\theta_1 + \theta_2) = N_1 \sin\theta_1 \\ N_2 \sin\theta_2 = N_3 \sin\theta_3 = N_4 \sin\theta_4 \\ 0 < \frac{1}{2} L \tan\alpha \tan\theta_2 + D_3 \tan\theta_3 + D_4 \tan\theta_4 < \frac{1}{2} L_0. \end{cases} \quad (2)$$

In these formulae, L represents a width of the bottom side of the slot 2, $L_0$ represents a width of the non-pixel area 5, α represents a base angle of the cross section of the slot 2, $N_1$ represents a refractive index of the light-exiting surface 14 of the light guide plate 1, $N_2$ represents a refractive index of the medium within the slot 2, $N_3$ represents a refractive index of a medium within the gap 3 between the light-exiting surface 14 of the light guide plate 1 and the substrate 4, $N_4$ represents a refractive index of the substrate 4, $\theta_1$ represents an incident angle of the light at the light-exiting surface 14 of the light guide plate (preferably, the incident angle $\theta_1$ is that the light generated by the direct-type backlight source is perpendicular to the light-exiting surface), $\theta_2$ represents an incident angle of the light from the medium within the slot 2 to the medium within the gap 3, $\theta_3$ represents an incident angle of the light from the medium within the gap 3 to the substrate 4, $\theta_4$ represents a refraction angle of the light from the medium within the gap 3 to the substrate, $D_3$ represents a thickness of the gap, and $D_4$ represents a thickness of the substrate.

Taking air as the medium within the slot 2 as an example, the refractive index $N_2$ of the medium within the slot 2 is less than the refractive index $N_1$ of the light-exiting surface 14 of the light guide plate 1. A part of the light generated by the direct-type light source and entering the light-exiting surface 14 of the light guide plate 1 will be refracted within the slot 2, and continuously refracted by the gap 3 between the light-exiting surface 14 of the light guide plate 1 and the substrate 4, and by the substrate 4. As a result, the light that should have been emitted toward the non-pixel area 5 will be refracted to the pixel area 6 in a divergent manner, as shown in FIG. 3.

Alternatively, the refractive index $N_1$ of the light-exiting surface 14 of the light guide plate 1 is 1.40, the refractive index $N_4$ of the substrate 4 is 1.50, the media within the slot 2 and the gap 3 are both air (under normal temperature and pressure, $N_2=N_3=1.00$), the width L of the bottom side of the slot 2 and the width $L_0$ of the non-pixel area 5 are both 35 µm, the base angle of the cross section of the slot 2 is 3°) ($\alpha=3°$, the thickness $D_4$ of the substrate 4 is 2500 µm, and the thickness $D_3$ of the gap 3 is 100 µm. As shown in FIG. 3, almost all of the light from the slot 2 enters the pixel area 6.

Second Embodiment

As shown in FIG. 4, when the medium within the slot 2 is optically denser medium relative to the medium of the light-exiting surface 14 of the light guide plate 1, i.e., the refractive index $N_2$ of the medium within the slot 2 is greater than the refractive index $N_1$ of the light-exiting surface 14 of the light guide plate 1, the following formula (3) shall be satisfied:

$$\begin{cases} L \approx L_0 \\ \theta_1 = \alpha \\ N_2\sin(\theta_1 - \theta_2) = N_1\sin\theta_1 \\ N_2\sin\theta_2 = N_3\sin\theta_3 = N_4\sin\theta_4 \\ D_3\tan\theta_3 + D_4\tan\theta_4 \geq L_0. \end{cases} \quad (3)$$

If it is not required that all (or almost all) of the light shall enter the pixel area 6, the following formula (4) shall be satisfied:

$$\begin{cases} L \approx L_0 \\ \theta_1 = \alpha \\ N_2\sin(\theta_1 - \theta_2) = N_1\sin\theta_1 \\ N_2\sin\theta_2 = N_3\sin\theta_3 = N_4\sin\theta_4 \\ 0 < D_3\tan\theta_3 + D_4\tan\theta_4 < L_0. \end{cases} \quad (4)$$

In these formulae, L represents a width of the bottom side of the slot 2, $L_0$ represents a width of the non-pixel area 5, $\alpha$ represents a base angle of the cross section of the slot 2, $N_1$ represents a refractive index of the light-exiting surface 14 of the light guide plate 1, $N_2$ represents a refractive index of the medium within the slot 2, $N_3$ represents a refractive index of a medium within the gap 3 between the light-exiting surface 14 of the light guide plate 1 and the substrate 4, $N_4$ represents a refractive index of the substrate 4, $\theta_1$ represents an incident angle of the light at the light-exiting surface 14 of the light guide plate (preferably, the incident angle $\theta_1$ is that the light generated by the direct-type backlight source is perpendicular to the light-exiting surface), $\theta_2$ represents an incident angle of the light from the medium within the slot 2 to the medium within the gap 3, $\theta_3$ represents an incident angle of the light from the medium within the gap 3 to the substrate 4, $\theta_4$ represents a refraction angle of the light from the medium within the gap to the substrate 4, $D_3$ represents a thickness of the gap 3, and $D_4$ represents a thickness of the substrate 4, as shown in FIG. 4.

Taking the medium within the slot 2 having a refractive index greater than the light-exiting surface 14 of the light guide plate 4 as an example (the second embodiment), as shown in FIG. 4, a part of the light generated by the direct-type light source and entering the light-exiting surface 14 of the light guide plate 1 will be refracted within the slot 2, and continuously refracted by the gap 3 between the light-exiting surface 14 of the light guide plate 1 and the substrate 4, and by the substrate 4. As a result, the light that should have been emitted toward the non-pixel area 5 will be refracted to the pixel area 6 in a convergent manner, and thereby almost all of the light from the slot 2 may enter the pixel area 6.

Alternatively, the refractive index $N_4$ of the substrate 4 is 1.50, the thickness $D_4$ of the substrate 4 is 2500 µm, the medium within the gap 3 is air and has a refractive index $N_3$ of 1.00, the thickness $D_3$ of the gap 3 is 100 µm, the refractive index $N_2$ of the medium within the slot 2 is 1.75, the width L of the bottom side of the slot 2 and the width $L_0$ of the non-pixel area are both 35 µm, the base angle of the cross section of the slot 2 is 5°) ($\alpha=5°$, and the refractive index $N_1$ of the light-exiting surface 14 of the light guide plate is 1.49.

The particular values of the above parameters and the kind of the media in the embodiments may be chosen according to the particular conditions, and are not limited to the above values and media. Such as, other desired medium may be added into gaps 3, the slot 2 is not an isosceles triangle, and so on.

In addition, the above slot may be provided according to the number, the position and the size of the corresponding non-pixel area, so that the number, position and size thereof are not limited to the above description.

The embodiments according to the present invention have the following advantageous effects. The slot is provided on the light-exiting surface of the light guide plate, so that a part of the light, generated by the direct-type light source and entering the light-exiting surface of the light guide plate, upon refracted by the slot, can travel outside the light-exiting surface of the light guide plate in a predetermined travelling direction and then can be refracted to the pixel area. As a result, it is able, on one hand, to prevent a light loss and an adverse affect on the electrical properties of a semiconductor area due to the absorption of the light in the non-pixel area, and on the other hand, to help to decrease the wire width of a black matrix, thereby to improve an aperture ratio and light transmission ratio of the liquid crystal panel.

The above are merely the preferred embodiments of the present invention. It should be noted that, a person skilled in the art may further make improvements and modifications without departing from the principle of the present invention, and these improvements and modifications shall also be considered as the scope of the present invention.

What is claimed is:

1. A liquid crystal display device, comprising:
a light source,
a light guide plate having a light-exiting surface,
a substrate having a first surface and a second surface opposite to the first surface, a display area of the second surface comprising a pixel area and at least one non-pixel area, and
a gap provided between the light-exiting surface of the light guide plate and the first surface of the substrate,
wherein,
at least one slot is formed in the light-exiting surface of the light guide plate;
a part of the light generated by the light source and entering the light-exiting surface of the light guide plate, after being refracted by the slot and the gap sequentially, is refracted by the first surface of the substrate into the substrate, and then enters the pixel area,
wherein at least one slot respectively corresponds to the at least one non-pixel area;

a bottom side of each slot has a width equal to the width of the non-pixel area, and the center line of the bottom side of the slot is aligned with the center line of the non-pixel area, and a projection of the non-pixel area onto the light-exiting surface of the light guide plate and a projection of the slot onto the light-exiting surface of the light guide plate coincide.

2. The liquid crystal display device according to claim 1, wherein the slot has a cross section of a triangle-like shape.

3. The liquid crystal display device according to claim 2, wherein the slot has a cross section of an isosceles triangle.

4. The liquid crystal display device according to claim 1, wherein a medium within the slot has a refractive index less than the refractive index of the light-exiting surface of the light guide plate, and the part of the light generated by the light source and entering the light-exiting surface of the light guide plate is refracted in the slot, and continuously refracted by the gap and the substrate, so that at least a part of the light that should have been emitted toward the non-pixel area can be refracted to the pixel area in a divergent manner.

5. The liquid crystal display device according to claim 1, wherein when the medium within the slot has a refractive index less than the refractive index of the light-exiting surface of the light guide plate, the following formula should be satisfied:

$$L \approx L_0$$
$$\theta_1 = \alpha$$
$$N_2 \sin(\theta_1 + \theta_2) = N_1 \sin\theta_1$$
$$N_2 \sin\theta_2 = N_3 \sin\theta_3 = N_4 \sin\theta_4$$
$$\frac{1}{2} L \tan\alpha \tan\theta_2 + D_3 \tan\theta_3 + D_4 \tan\theta_4 \geq \frac{1}{2} L_0,$$

wherein L represents a width of the bottom side of the slot, L0 represents a width of the non-pixel area, α represents a base angle of the cross section of the slot, N1 represents a refractive index of the light-exiting surface of the light guide plate, N2 represents a refractive index of the medium within the slot, N3 represents a refractive index of a medium within the gap, N4 represents a refractive index of the substrate, θ1 represents an incident angle of the light at the light-exiting surface of the light guide plate, θ2 represents an incident angle of the light from the medium within the slot to the medium within the gap, θ3 represents an incident angle of the light from the medium within the gap to the substrate, θ4 represents a refraction angle of the light from the medium within the gap to the substrate, D3 represents a thickness of the gap, and D4 represents a thickness of the substrate.

6. The liquid crystal display device according to claim 4, wherein when the medium within the slot has a refractive index less than the refractive index of the light-exiting surface of the light guide plate, the following formula should be satisfied:

$$L \approx L_0$$
$$\theta_1 = \alpha$$
$$N_2 \sin(\theta_1 + \theta_2) = N_1 \sin\theta_1$$
$$N_2 \sin\theta_2 = N_3 \sin\theta_3 = N_4 \sin\theta_4$$
$$\frac{1}{2} L \tan\alpha \tan\theta_2 + D_3 \tan\theta_3 + D_4 \tan\theta_4 \geq \frac{1}{2} L_0,$$

wherein L represents a width of the bottom side of the slot, L0 represents a width of the non-pixel area, α represents a base angle of the cross section of the slot, N1 represents a refractive index of the light-exiting surface of the light guide plate, N2 represents a refractive index of the medium within the slot, N3 represents a refractive index of a medium within the gap, N4 represents a refractive index of the substrate, θ1 represents an incident angle of the light at the light-exiting surface of the light guide plate, θ2 represents an incident angle of the light from the medium within the slot to the medium within the gap, θ3 represents an incident angle of the light from the medium within the gap to the substrate, θ4 represents a refraction angle of the light from the medium within the gap to the substrate, D3 represents a thickness of the gap, and D4 represents a thickness of the substrate.

7. The liquid crystal display device according to claim 1, wherein when the medium within the slot has a refractive index less than the refractive index of the light-exiting surface of the light guide plate, the following formula should be satisfied:

$$L \approx L_0$$
$$\theta_1 = \alpha$$
$$N_2 \sin(\theta_1 + \theta_2) = N_1 \sin\theta_1$$
$$N_2 \sin\theta_2 = N_3 \sin\theta_3 = N_4 \sin\theta_4$$
$$0 < \frac{1}{2} L \tan\alpha \tan\theta_2 + D_3 \tan\theta_3 + D_4 \tan\theta_4 < \frac{1}{2} L_0,$$

wherein L represents a width of the bottom side of the slot, L0 represents a width of the non-pixel area, α represents a base angle of the cross section of the slot, N1 represents a refractive index of the light-exiting surface of the light guide plate, N2 represents a refractive index of the medium within the slot, N3 represents a refractive index of a medium within the gap, N4 represents a refractive index of the substrate, θ1 represents an incident angle of the light at the light-exiting surface 14 of the light guide plate, θ2 represents an incident angle of the light from the medium within the slot to the medium within the gap, θ3 represents an incident angle of the light from the medium within the gap to the substrate, θ4 represents a refraction angle of the light from the medium within the gap to the substrate, D3 represents a thickness of the gap, and D4 represents a thickness of the substrate.

8. The liquid crystal display device according to claim 4, wherein when the medium within the slot has a refractive index less than the refractive index of the light-exiting surface of the light guide plate, the following formula should be satisfied:

$$L \approx L_0$$
$$\theta_1 = \alpha$$
$$N_2\sin(\theta_1 + \theta_2) = N_1\sin\theta_1$$
$$N_2\sin\theta_2 = N_3\sin\theta_3 = N_4\sin\theta_4$$
$$0 < \frac{1}{2}L\tan\alpha\tan\theta_2 + D_3\tan\theta_3 + D_4\tan\theta_4 < \frac{1}{2}L_0,$$

wherein L represents a width of the bottom side of the slot, L0 represents a width of the non-pixel area, α represents a base angle of the cross section of the slot, N1 represents a refractive index of the light-exiting surface of the light guide plate, N2 represents a refractive index of the medium within the slot, N3 represents a refractive index of a medium within the gap, N4 represents a refractive index of the substrate, θ1 represents an incident angle of the light at the light-exiting surface 14 of the light guide plate, θ2 represents an incident angle of the light from the medium within the slot to the medium within the gap, θ3 represents an incident angle of the light from the medium within the gap to the substrate, θ4 represents a refraction angle of the light from the medium within the gap to the substrate, D3 represents a thickness of the gap, and D4 represents a thickness of the substrate.

9. The liquid crystal display device according to claim 1, wherein the medium within the slot has a refractive index greater than the refractive index of the light-exiting surface of the light guide plate, and the part of the light generated by the light source and entering the light-exiting surface of the light guide plate is refracted within the slot, and continuously refracted by the gap and the substrate, so that the light that should have been emitted toward the non-pixel area is refracted to the pixel area in a convergent manner.

10. The liquid crystal display device according to claim 1, wherein when the medium within the slot has a refractive index greater than the refractive index of the light-exiting surface of the light guide plate, the following formula should be satisfied:

$$L \approx L_0$$
$$\theta_1 = \alpha$$
$$N_2\sin(\theta_1 - \theta_2) = N_1\sin\theta_1$$
$$N_2\sin\theta_2 = N_3\sin\theta_3 = N_4\sin\theta_4$$
$$D_3\tan\theta_3 + D_4\tan\theta_4 \geq L_0,$$

wherein L represents a width of the bottom side of the slot, L0 represents a width of the non-pixel area, α represents a base angle of the cross section of the slot, N1 represents a refractive index of the light-exiting surface of the light guide plate, N2 represents a refractive index of the medium within the slot, N3 represents a refractive index of a medium within the gap, N4 represents a refractive index of the substrate, θ1 represents an incident angle of the light at the light-exiting surface of the light guide plate, θ2 represents an incident angle of the light from the medium within the slot to the medium within the gap, θ3 represents an incident angle of the light from the medium within the gap to the substrate, θ4 represents a refraction angle of the light from the medium within the gap to the substrate, D3 represents a thickness of the gap, and D4 represents a thickness of the substrate.

11. The liquid crystal display device according to claim 9, wherein when the medium within the slot has a refractive index greater than the refractive index of the light-exiting surface of the light guide plate, the following formula should be satisfied:

$$L \approx L_0$$
$$\theta_1 = \alpha$$
$$N_2\sin(\theta_1 - \theta_2) = N_1\sin\theta_1$$
$$N_2\sin\theta_2 = N_3\sin\theta_3 = N_4\sin\theta_4$$
$$D_3\tan\theta_3 + D_4\tan\theta_4 \geq L_0,$$

wherein L represents a width of the bottom side of the slot, L0 represents a width of the non-pixel area, α represents a base angle of the cross section of the slot, N1 represents a refractive index of the light-exiting surface of the light guide plate, N2 represents a refractive index of the medium within the slot, N3 represents a refractive index of a medium within the gap, N4 represents a refractive index of the substrate, θ1 represents an incident angle of the light at the light-exiting surface of the light guide plate, θ2 represents an incident angle of the light from the medium within the slot to the medium within the gap, θ3 represents an incident angle of the light from the medium within the gap to the substrate, θ4 represents a refraction angle of the light from the medium within the gap to the substrate, D3 represents a thickness of the gap, and D4 represents a thickness of the substrate.

12. The liquid crystal display device according to claim 1, wherein when the medium within the slot has a refractive index greater than the refractive index of the light-exiting surface of the light guide plate, the following formula should be satisfied:

$$L \approx L_0$$
$$\theta_1 = \alpha$$
$$N_2\sin(\theta_1 - \theta_2) = N_1\sin\theta_1$$
$$N_2\sin\theta_2 = N_3\sin\theta_3 = N_4\sin\theta_4$$
$$0 < D_3\tan\theta_3 + D_4\tan\theta_4 < L_0,$$

wherein L represents a width of the bottom side of the slot, L0 represents a width of the non-pixel area, α represents a base angle of the cross section of the slot, N1 represents a refractive index of the light-exiting surface of the light guide plate, N2 represents a refractive index of the medium within the slot, N3 represents a refractive index of a medium within the gap, N4 represents a refractive index of the substrate, θ1 represents an incident angle of the light at the light-exiting surface of the light guide plate, θ2 represents an incident angle of the light from the medium within the slot to the medium within the gap, θ3 represents an incident angle of the light from the medium within the gap to the substrate, θ4 represents a refraction angle of the light from the medium within the gap to the substrate, D3 represents a thickness of the gap, and D4 represents a thickness of the substrate.

13. The liquid crystal display device according to claim 9, wherein when the medium within the slot has a refractive index greater than the refractive index of the light-exiting surface of the light guide plate, the following formula should be satisfied:

$$L \approx L_0$$
$$\theta_1 = \alpha$$
$$N_2\sin(\theta_1 - \theta_2) = N_1\sin\theta_1$$
$$N_2\sin\theta_2 = N_3\sin\theta_3 = N_4\sin\theta_4$$
$$0 < D_3\tan\theta_3 + D_4\tan\theta_4 < L_0,$$

wherein L represents a width of the bottom side of the slot, L0 represents a width of the non-pixel area, α represents a base angle of the cross section of the slot, N1 represents a refractive index of the light-exiting surface of the light guide plate, N2 represents a refractive index of the medium within the slot, N3 represents a refractive index of a medium within the gap, N4 represents a refractive index of the substrate, θ1 represents an incident angle of the light at the light-exiting surface of the light guide plate, θ2 represents an incident angle of the light from the medium within the slot to the medium within the gap, θ3 represents an incident angle of the light from the medium within the gap to the substrate, θ4 represents a refraction angle of the light from the medium within the gap to the substrate, D3 represents a thickness of the gap, and D4 represents a thickness of the substrate.

14. The liquid crystal display device according to claim 1, wherein the light source generates the light perpendicular to the light-exiting surface of the light guide plate.

15. The liquid crystal display device according to claim 1, wherein the light source generates the light perpendicular to the light-exiting surface of the light guide plate.

16. The liquid crystal display device according to claim 9, wherein the light source generates the light perpendicular to the light-exiting surface of the light guide plate.

17. The liquid crystal display device according to claim 1, wherein the light source is a direct-type backlight source.

18. The liquid crystal display device according to claim 1, wherein the substrate is display panel, the pixel area is light-emitting area, and the non-pixel area is light-shaping area.

19. A liquid crystal display device, comprising:
a light source,
a light guide plate having a light-exiting surface,
a substrate having a first surface and a second surface opposite to the first surface, a display area of the second surface comprising a pixel area and at least one non-pixel area, and
a gap provided between the light-exiting surface of the light guide plate and the first surface of the substrate,
wherein,
at least one slot is formed in the light-exiting surface of the light guide plate;
a part of the light generated by the light source and entering the light-exiting surface of the light guide plate, after being refracted by the slot and the gap sequentially, is refracted by the first surface of the substrate into the substrate, and then enters the pixel area;
wherein the light source is a direct-type backlight source;
a bottom side of each slot has a width equal to the width of the non-pixel area, and the center line of the bottom side of the slot is aligned with the center line of the non-pixel area, and a projection of the non-pixel area onto the light-exiting surface of the light guide plate and a projection of the slot onto the light-exiting surface of the light guide plate coincide.

* * * * *